United States Patent [19]

Yamada

[11] Patent Number: 4,853,881

[45] Date of Patent: Aug. 1, 1989

[54] COMBINATORIAL WEIGHING SYSTEM

[75] Inventor: Seiji Yamada, Kyoto, Japan

[73] Assignee: Ishida Scales Mfg. Co., Ltd., Kyoto, Japan

[21] Appl. No.: 256,170

[22] Filed: Oct. 7, 1988

Related U.S. Application Data

[63] Continuation of Ser. No. 726,601, Apr. 23, 1985, abandoned.

[30] Foreign Application Priority Data

Apr. 25, 1984 [JP] Japan .................................. 59-83484

[51] Int. Cl.⁴ ...................... G01G 13/02; G01G 19/22
[52] U.S. Cl. .................................. 364/567; 209/592; 177/25.11; 177/25.18
[58] Field of Search ................... 364/567, 568; 177/59, 177/25.11, 25.12, 25.13, 25.18; 209/592, 593, 595

[56] References Cited

U.S. PATENT DOCUMENTS

| | | | |
|---|---|---|---|
| 4,341,274 | 7/1982 | Hirano et al. | 364/567 |
| 4,385,671 | 5/1983 | Hirano | 364/567 |
| 4,388,975 | 6/1983 | Hirano | 364/567 |
| 4,398,614 | 8/1983 | Kakita et al. | 177/59 |
| 4,399,880 | 8/1983 | Konishi | 177/59 |
| 4,418,771 | 12/1983 | Henry et al. | 364/567 |
| 4,441,567 | 4/1984 | Hirano | 364/567 |
| 4,454,924 | 6/1984 | Minamida | 177/59 |
| 4,466,500 | 8/1984 | Mosher et al. | 364/567 |
| 4,467,880 | 8/1984 | Minamida et al. | 177/59 |
| 4,519,042 | 5/1985 | Minamida et al. | 364/567 |
| 4,527,645 | 7/1985 | Sashiki et al. | 177/25 |
| 4,549,617 | 10/1985 | Matsumoto et al. | 177/25 |
| 4,553,617 | 11/1985 | Tatematsu | 177/59 |
| 4,557,340 | 12/1985 | Fukuda | 364/567 |
| 4,560,015 | 12/1985 | Minamida | 177/59 |
| 4,566,070 | 1/1986 | Tanaka | 177/25 |
| 4,574,897 | 3/1986 | Minamida et al. | 177/59 |
| 4,739,846 | 4/1988 | Minamida et al. | 364/567 |

FOREIGN PATENT DOCUMENTS 0043678 1/1982 European Pat. Off. .

Primary Examiner—Parshotam S. Lall
Assistant Examiner—Brian M. Mattson
Attorney, Agent, or Firm—Staas & Halsey

[57] ABSTRACT

A combinatorial weighing system includes a combinatorial weighing apparatus, a packing machine and master/slave changeover switch. The combinatorial weighing apparatus has a plurality of weighing machines for sensing the weight of articles supplied thereto, and a calculation control unit for performing a combinatorial calculation, based on weight data from the weighing machines, to obtain an optimum combination, and for causing weighing machines corresponding to the optimum combination to discharge their articles. The articles are then packed by the packing machine. The master/slave changeover switch switches between a mode in which the packing machine is the master of the weighing and packing operation and a mode in which the weighing apparatus is the master of the weighing and packing operation. The arrangement results in a combinatorial weighing apparatus which has greatly simplified hardware and which can operate in association with either a master- or slave-type packing machine.

5 Claims, 2 Drawing Sheets

COMBINATORIAL WEIGHING SYSTEM

This is a continuation of copending application Ser. No. 726,601 filed on Apr. 23, 1985 now abandoned.

BACKGROUND OF THE INVENTION

This invention relates to a combinatorial weighing system and, more particularly, to a combinatorial weighing system arranged so that a combinatorial weighing apparatus can be used with either a master-type packing machine or a slave-type packing machine by effecting a changeover between processing modes.

A combinatorial weighing apparatus now in practical use includes a plurality of weighing machines having respective weight sensors for weighing articles introduced into corresponding weighing hoppers, a multiplexer, an AD converter and a calculation control unit constituted by a microcomputer or the like which receives the measured weight values from the weighing machines through the AD converter and multiplexer. Under the control of a program stored in an internal memory, the calculation control unit generates combination patterns, each of which represents a different combination of the received weight values, and calculates the total weight of each combination. The calculation control unit compares each total weight value with signals from setting units which are used for setting a target weight value and allowable weight limits, selects a combination (referred to as the "optimum combination") the total weight value of which is equal to the set target weight or closest to the set target weight within the allowable weight limits, and causes the weighing hoppers of those weighing machines that have provided the weight values belonging to the optimum combination to discharge their articles.

The articles discharged from the combinatorial weighing apparatus are delivered to a nearby packing machine for packing the articles in a prescribed manner. As mentioned above, these articles are discharged from weighing machines selected on the basis of the optimum combination obtained through calculations for combinatorial weighing. In packing the discharged articles, there are instances where the operating conditions for packing may be satisfied on the packing machine side, while the conditions for discharging the articles are not satisfied on the side of the combinatorial weighing apparatus, as when the weighing apparatus has not been supplied with articles or is incapable of obtaining a combination within the allowable limits. In such case the packing machine continues to run and perform a packing operation on the assumption that articles are being discharged from the weighing apparatus, with the result that empty packages are sealed and discharged from the packing machine. This lowers the efficiency of the overall system. Accordingly, the usual practice is to control the combinatorial weighing apparatus and the packing machine in tandem in such a manner that the two may run efficiently in an operatively associated manner.

In order to achieve such control of the weighing apparatus and packing machine, two packing machine configurations are available, as illustrated in Figs. 3(a) and (b).

FIG. 3(a) illustrates a master-type packing machine which, in effect, controls the combinatorial weighing apparatus by supplying it with a timing signal each time articles are packed. The timing signal acts as a combinatorial weighing start signal to which the combinatorial apparatus responds by starting a combinatorial weighing operation.

FIG. 3(b) depicts a slave-type packing machine which the combinatorial weighing apparatus supplies with a discharge signal each time articles are weighed out, the signal acting as a packing start signal. The combinatorial weighing apparatus thus controls the packing machine, which is adapted to produce a signal indicating that conditions for starting packing are satisfied.

A disadvantage with this prior-art arrangement is that combinatorial weighing apparatus having different constructions must be used depending upon which of the two packing machines is adopted. The end result is a facility of high cost.

SUMMARY OF THE INVENTION

An object of the present invention is to provide a combinatorial weighing system comprising a combinatorial weighing apparatus and a packing machine, which system enables a reduction in facility cost by being adaptable to packing machines of both the master and slave types.

According to the present invention, the foregoing object is attained by providing a combinatorial weighing system comprising a combinatorial weighing apparatus having a plurality of weighing machines for sensing the weight of articles supplied thereto and for producing weight data indicative of the sensed weights, and a calculation control unit for performing a combinatorial calculation based on the weight data from the weighing machines and for causing weighing machines corresponding to an optimum combination to discharge their articles; a packing machine packs the articles discharged from the combinatorial weighing apparatus. The system includes master/slave changeover means for changing over between a first processing mode for driving the combinatorial weighing apparatus in response to a signal from the packing machine, and a second processing mode for driving the packing machine in response to a signal from the combinatorial weighing apparatus, whereby the combinatorial weighing apparatus and the packing machine are each capable of being controlled in a master/slave relation.

Other features and advantages of the present invention will be apparent from the following description taken in conjunction with the accompanying drawings.

DESCRIPTION OF THE PREFERRED EMBODIMENT

A preferred embodiment of the present invention will now be described with reference to the drawings.

Figure 1:
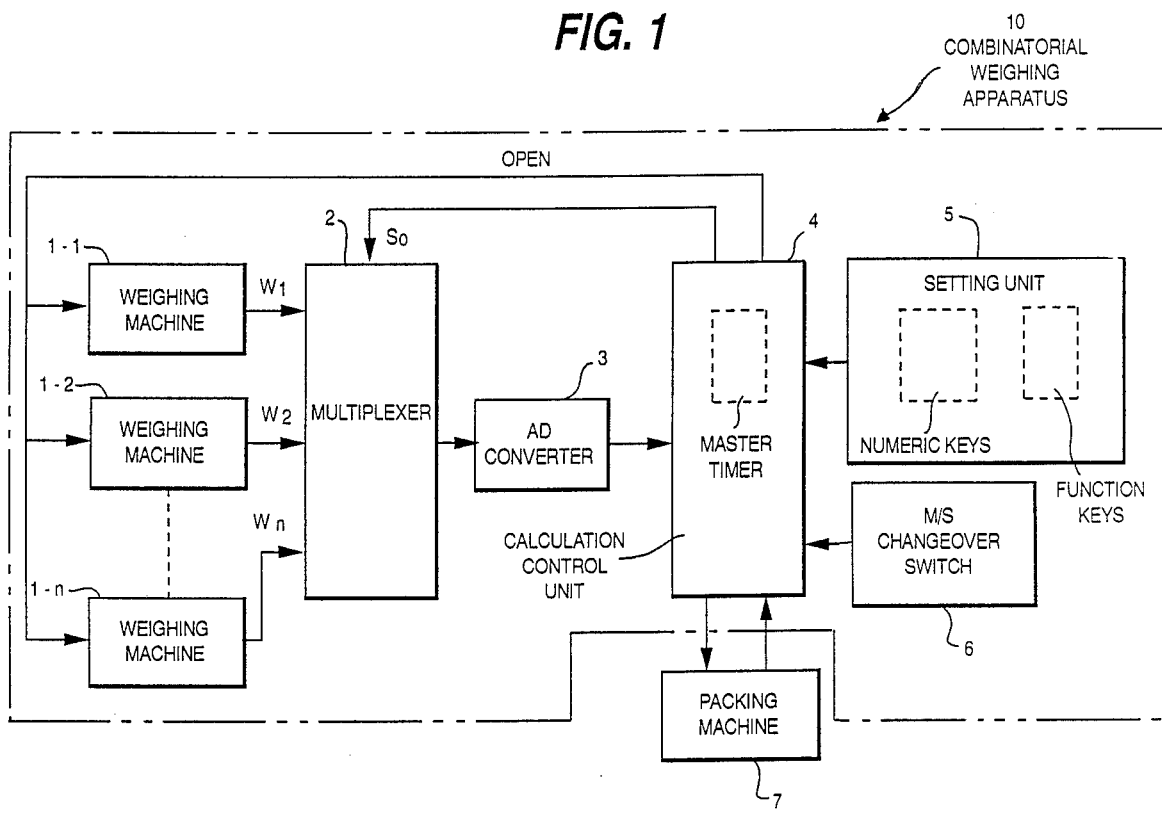
FIG. 1 is a block diagram of an embodiment of a combinatorial weighing system according to the present invention.
Figure 3:
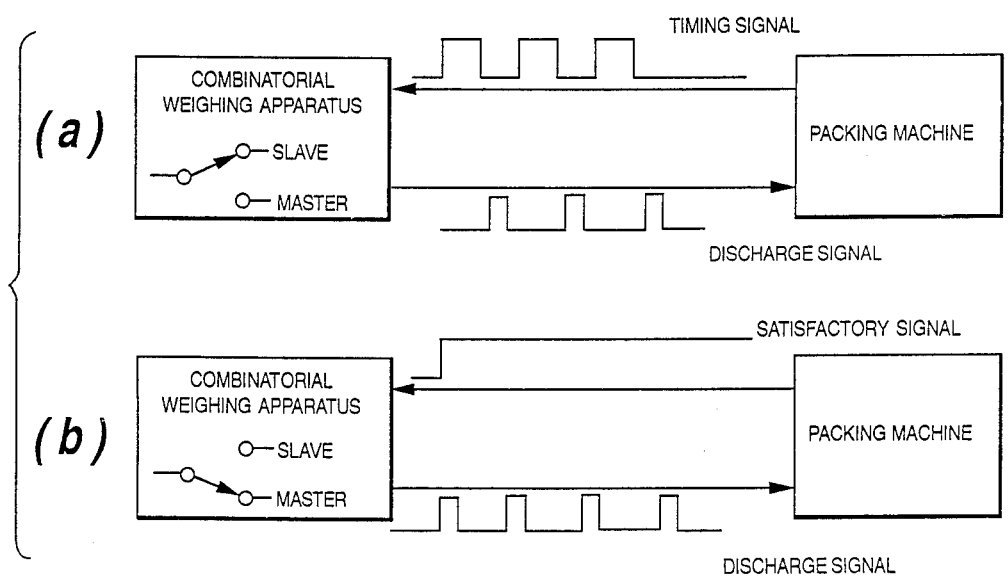
FIGS. 3(a)-(b) are block diagrams of the relationship between a combinatorial weighing apparatus and a packing machine.

As shown in the block diagram of FIG. 1, a combinatorial weighing system according to the present invention comprises a combinatorial weighing 10 having a combinatorial weighing circuit including a plurality of weighing machines 1-1, 1-2, ... 1-n, a multiplexer 2 to which the outputs of the weighing machines are connected, an AD converter 3 to which the output of the multiplexer 2 is connected, a calculation control unit 4 to which the output of the AD converter 3 is connected, and a setting unit 5 whose output is connected to the calculation control unit 4, a master/slave (M/S) changeover switch 6 has an output which is also connected to the calculation control unit 4.

The weighing machines 1-1, 1-2, ... 1-n each have a weight sensor (not shown) for weighing articles with which the weighing machines are supplied, the weighing sensors producing weight data W1, W2, ... Wn, respectively, indicative of the weights measured thereby. Each item of weight data is an analog value. It should be noted that each weighing machine also includes a weighing hopper (not shown) that actually receives the articles to be weighed. The weight data W1, W2, ... Wn delivered by the weighing machines are fed into the multiplexer 2 which is adapted to deliver the items of weight data one at a time in sequential fashion to the AD converter 3 in response to a changeover signal So received from a calculation control unit 4. The AD converter 3 converts the weight data W1, W2, ... Wn received from the multiplexer 2 into digital values and feeds the digital weight data into the calculation control unit 4. The latter is composed of a microcomputer for performing a combinatorial calculation on the basis of the weight data from the AD converter 3 and includes a processor, various memories (such as a program memory and working memory), a master timer and input/output interface circuitry. The setting unit 5 is equipped with numeric keys and function keys and is manipulated by an operator to provide the calculation control unit 4 with signals indicative of a target weight, upper and lower weight limits defining an allowable range, and the like. The M/S changeover switch 6 comprises a master switch and a slave switch. Signals produced by operating the master and slave switches are applied to the calculation control unit 4.

The combinatorial weighing system of the present invention also includes a packing machine 7 disposed in the vicinity of the combinatorial weighing apparatus 10. If the packing machine 7 is of the master type, closing the slave switch of the M/S changeover switch 6 provided on the combinatorial weighing apparatus 10 enables the weighing apparatus to be controlled by a timing signal from the packing machine 7, in response to which signal the weighing apparatus executes combinatorial weighing. If the packing machine 7 is of the slave type, closing the master switch of the M/S changeover switch 6 starts a master timer built in the calculation control unit 4 and causes the combinatorial weighing apparatus 10 to execute combinatorial weighing. When weighed articles are discharged from the combinatorial weighing apparatus 10, the calculation control unit 4 supplies the packing machine 7 with a discharge signal that serves as a signal to start the operation of the packing machine 7.

The combinatorial weighing apparatus 10 operates under the control of a program stored in the program memory incorporated in the calculation control unit 4. Let n be the number of weighing machines. In operation, the combinatorial weighing apparatus 10 generates, e.g., $2^n - 1$ combination patterns in accordance with which the weight values W1, W2, ... Wn from the weighing machines are subjected to a combinatorial calculation. The calculation control unit 4, upon calculating the total weight of each combination of weight values, compares the total weight values with the target weight value and with the limit values preset by the numeric keys and function keys of the setting unit 5, selects a combination of weighing machines corresponding to an optimum combination, and causes gates provided on the weighing hoppers of the selected weighing machines to open, whereby the weighing hoppers discharge their articles.

Figure 2:
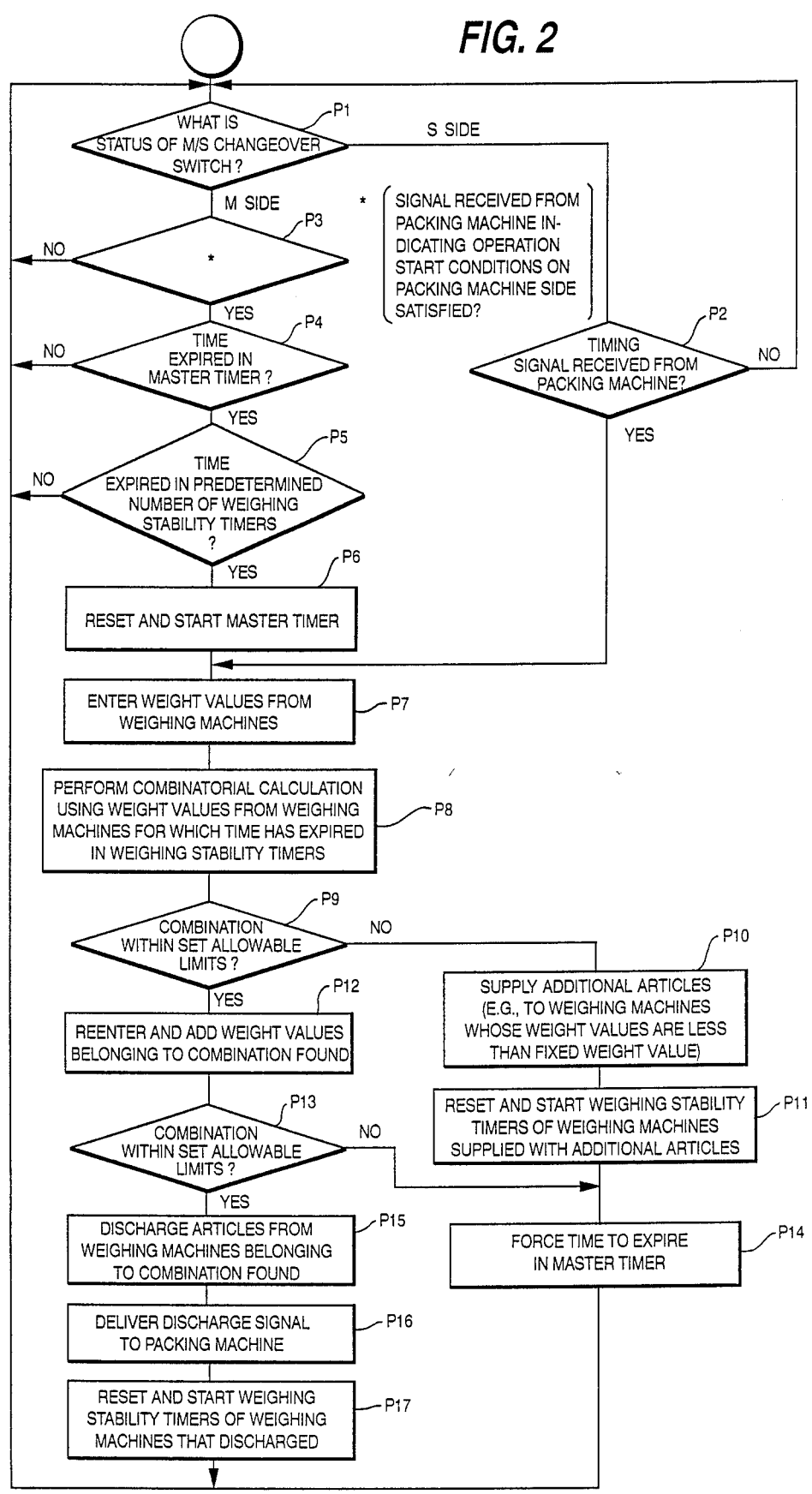
FIG. 2 is a flowchart of a processing sequence according to the present invention.

The present invention will now be described with reference to the flowchart of FIG. 2, which illustrates a processing sequence according to the present invention.

(1) Step P1 of the flowchart calls for the calculation control unit 4 to check the status of the master/slave changeover switch 6. If the slave side (S side) of the switch has been closed, that is, if a master-type packing machine 7 is being used, then the program proceeds to a step P2, where it is determined whether the packing machine 7 has provided the combinatorial weighing apparatus with a timing signal, namely a signal commanding the start of combinatorial weighing. If the decision here is affirmative, combinatorial weighing, which starts at a step P7, is executed. If an optimum combination of weighing machines is found to exist, the calculation control unit 4 causes these machines to discharge their articles and delivers a discharge signal to the packing machine 7. If the decision at the step P1 is that the master side of the changeover switch 6 has been closed, that is, if a slave-type packing machine 7 is being used, then the program proceeds to a step P3. The packing machine 7 starts packing in response to the discharge signal supplied to it by the combinatorial weighing apparatus 10 each time articles are weighed out. The calculation control unit 4 confirms at the step P3 whether the combinatorial weighing apparatus has received a signal from the packing machine 7 indicating that operation start conditions on the packing machine side are satisfied. If the conditions are satisfied, then the calculation control unit 4 determines at a step P4 whether the time has expired in the master timer and then, at a step P5, whether the time has expired in a predetermined number of weighing stability timers provided on respective ones of the weighing machines. This latter step is for the purpose of determining whether a number of weighing machines required to participate in combinatorial weighing have stabilized. If affirmative decisions are rendered at the steps P4, P5, then the calculation control unit 4 resets and starts the master timer at a step P6.

(2) The program then proceeds to the step P7, which calls for the calculation control unit 4 to accept the weight values W1, W2, ... Wn from the respective weighing machines 1-1, 1-2, ..., 1-n. Next, at a step P8, the calculation control unit executes combinatorial calculations on the basis of the combination patterns using the weight values from weighing machines which have stabilized, as indicated by expiration of the time in their weighing stability timers. The calculation control unit 4 determines at a step P9 whether data obtained by the combinatorial calculations lies within the allowable limits. If a negative decision is rendered, weighing machines delivering weight values less than a fixed weight value are supplied with additional articles at a step P10, and the weighing stability timers of these supplemented weighing machines are reset and started at a step P11. This is followed by a step P14, at which the calculation control unit 4 forces the time in the master timer to expire. Processing then returns to the step P1.

(3) If the total weight of a combination is determined to fall within the allowable limits at the step P9, the calculation control unit 4 again accepts and adds the weight values belonging to the combination found. This is performed at a step P12. Then, at a step P13, the calculation control unit 4 determines whether the total weight of the combination falls within the allowable limits. If an affirmative decision is rendered, then the program proceeds to a step P15, which calls for the calculation control unit 4 to effect the discharge of the articles from the weighing machines corresponding to the combination found, and then to a step P16, at which the calculation control unit 4 applies the discharge signal to the packing machine 7. In response, if the packing machine 7 is of the slave type, the packing machine starts operating to pack the articles weighed out and discharged by the combinatorial weighing apparatus 10.

The weighing stability timers of the weighing machines that have discharged their articles are reset and started at a step P17. When the time to which the master timer has been set expires, the master timer issues a time-up signal.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing system comprising:
    a combinatorial weighing apparatus including:
        a plurality of weighing machines for sensing the weight of articles supplied thereto and for producing weight data indicative of the sensed weights; and
        a calculation control unit for performing a combinatorial calculation based on the weight data from the weighing machines and for causing weighing machines corresponding to an optimum combination to discharge their articles, said calculation control unit being capable of receiving a first signal or transmitting a second signal;
    a packing machine positioned for packing the articles discharged from said combinatorial weighing apparatus; and
    master/slave changeover means, connected to said calculation control unit, for selecting a slave mode when said combinatorial weighing apparatus is to be driven in response to the first signal from said packing machine and for selecting a master mode when said combinatorial weighing apparatus is to drive said packing machine by transmission of the second signal to said packaging machine, whereby said combinatorial weighing apparatus and said packing machine are each controlled in a master/slave relation.

2. The system according to claim 1 wherein said master/slave changeover means is a part of said combinatorial weighing apparatus.

3. A combinatorial weighing system operatively connected to one of first and second types of packing machines, comprising:
    a combinatorial weighing circuit capable of operating in master and slave modes corresponding to the first and second types of packing machines, respectively, said combinatorial weighing circuit including:
        a plurality of weighing machines for sensing the weight of articles supplied thereto and for producing weight data indicative of the sensed weights; and
        a calculation control unit, coupled to said weighing machines, for performing a combinatorial calculation based on the weight data from the weighing machines to determine an optimum combination, and for causing those weighing machines corresponding to the optimum combination to discharge their articles to the packing machine to which said combinatorial weighing system is connected;
    a master/slave changeover switch, connected to said calculation control unit, for switching said combinatorial weighing circuit between the master and slave modes in dependence upon the one of the first and second types of packing machines which is connected to said combinatorial weighing system, said combinatorial weighing circuit being driven in response to a control signal from the connected packing machine when said combinatorial weighing circuit is in the slave mode, the connected packing machine being driven in response to a control signal from said combinatorial weighing circuit when said combinatorial weighing circuit is in the master mode, so that either said combinatorial weighing circuit or the connected packing machine can be controlled in a master/slave relation.

4. A combinatorial measuring system operatively connected to one of first and second types of packing machines, comprising:
    means for providing a plurality of measured data corresponding to measured values of a plurality of batches of articles;
    means for performing a combinatorial calculation based on the measured data to obtain a combination of the measured data within preset allowable limits, and for causing the batches of articles, corresponding to the selected combination of measured data, to be discharged to the connected packing machine, said means for performing a combinatorial calculation capable of operating in master and slave modes respectively corresponding to the first and second types of packing machines; and
    switching means for generating a control signal for controlling whether said means for performing a combinatorial calculation is in the master or slave mode, said means for performing a combinatorial calculation being driven under the control of the connected packing machine when in the slave mode, said means for performing a combinatorial calculation driving the connected packing machine when in the master mode, so that either of said means for performing a combinatorial calculation and the connected packing machine may be controlled in a master/slave relation.

5. A combinatorial measuring system as set forth in claim 4, wherein said switching means comprises a master/slave changeover switch.

* * * * *